(12) United States Patent
Steeves

(10) Patent No.: US 10,633,107 B2
(45) Date of Patent: Apr. 28, 2020

(54) INLET SEAL FOR A TURBOSHAFT ENGINE

(71) Applicant: Sikorsky Aircraft Corporation, Stratford, CT (US)

(72) Inventor: Zachariah Steeves, Monroe, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 446 days.

(21) Appl. No.: 15/192,394

(22) Filed: Jun. 24, 2016

(65) Prior Publication Data

US 2017/0029130 A1 Feb. 2, 2017

Related U.S. Application Data

(60) Provisional application No. 62/197,206, filed on Jul. 27, 2015.

(51) Int. Cl.
*B64D 33/02* (2006.01)
*B64D 27/10* (2006.01)
*B64C 27/04* (2006.01)

(52) U.S. Cl.
CPC .............. *B64D 33/02* (2013.01); *B64C 27/04* (2013.01); *B64D 27/10* (2013.01)

(58) Field of Classification Search
CPC .......... B64D 33/02; B64D 27/10; B64C 27/04
See application file for complete search history.

(56) References Cited

U.S. PATENT DOCUMENTS

| | | | |
|---|---|---|---|
| 3,591,963 A | 7/1971 | Kopp | |
| 5,106,397 A * | 4/1992 | Jaroszczyk | B01D 46/0043 181/276 |
| 5,433,070 A | 7/1995 | Amelio | |
| 5,474,337 A * | 12/1995 | Nepsund | F16L 21/03 285/345 |
| 5,706,648 A | 1/1998 | Porte et al. | |
| 6,289,289 B1 | 9/2001 | Zweifel | |
| 7,634,984 B2 * | 12/2009 | Stelzer | B01D 46/0005 123/198 E |
| 7,739,865 B2 | 6/2010 | Prasad et al. | |
| 7,953,559 B2 | 5/2011 | Sundermeyer et al. | |
| 8,079,809 B2 | 12/2011 | Selder et al. | |
| 8,571,814 B2 | 10/2013 | Zhao et al. | |
| 8,868,284 B2 | 10/2014 | Isom et al. | |
| 2007/0022723 A1 * | 2/2007 | Stelzer | B64D 33/02 55/502 |
| 2012/0031193 A1 | 2/2012 | Adams et al. | |
| 2013/0275059 A1 | 10/2013 | Bernhard et al. | |

FOREIGN PATENT DOCUMENTS

EP 2725337 A1 4/2014
WO 2013191594 A1 12/2013

* cited by examiner

*Primary Examiner* — Brian M O'Hara
*Assistant Examiner* — Keith L Dixon
(74) *Attorney, Agent, or Firm* — Cantor Colburn LLP

(57) ABSTRACT

A turboshaft engine includes an inlet, a swirl frame mounted downstream of the inlet, and an inlet seal mounted to one of the inlet and the swirl frame extending toward the other of the inlet and the swirl frame. The inlet seal includes a support member and an elastomeric member extending from a first end portion coupled to the support member to a second, cantilevered end portion.

21 Claims, 5 Drawing Sheets

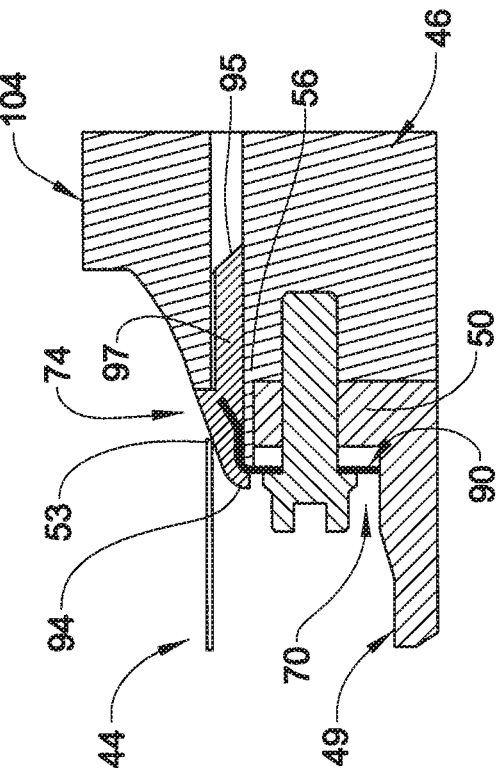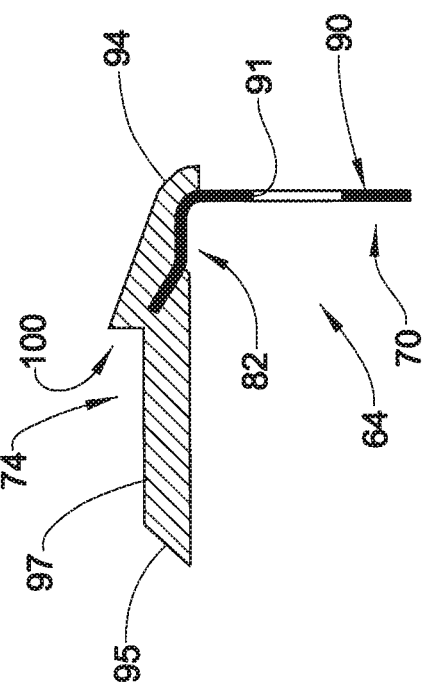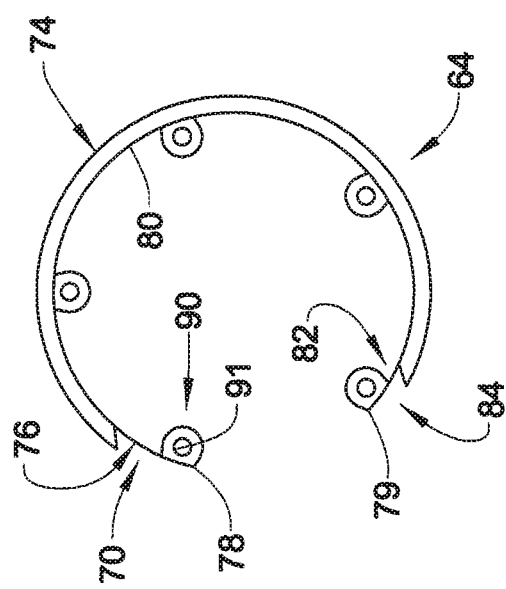

INLET SEAL FOR A TURBOSHAFT ENGINE

CROSS-REFERENCE TO RELATED APPLICATIONS

This application claims the benefit of priority to U.S. Provisional Application No. 62/197,206, filed on Jul. 27, 2015. The entire contents of U.S. Provisional Application No. 62/197,206 are incorporated herein by reference.

BACKGROUND

Exemplary embodiments pertain to the art of inlet seals and, more particularly, to an inlet seal for a turboshaft engine.

Turboshaft engine components are constructed with a number of tolerances that accommodate installation variances as well as thermal expansion. The tolerances often result in gaps, of various dimensions, that may allow fluids, such as air, to pass between interfacing surfaces. Gaps may also lead to pressure losses. Loss of fluids and/or pressure through the gaps could negatively impact an overall operational efficiency of the engine.

BRIEF DESCRIPTION

Disclosed is a turboshaft engine including an inlet, a swirl frame mounted downstream of the inlet, and an inlet seal mounted to one of the inlet and the swirl frame extending toward the other of the inlet and the swirl frame. The inlet seal includes a support member and an elastomeric member having a first end portion coupled to the support member and a second, cantilevered end portion.

In addition to one or more of the features described above or below, or as an alternative, further embodiments could include wherein the support member includes a discontinuous surface having a first end, a second end, and an intermediate portion extending therebetween.

In addition to one or more of the features described above or below, or as an alternative, further embodiments could include wherein the intermediate portion is curvilinear.

In addition to one or more of the features described above or below, or as an alternative, further embodiments could include wherein the intermediate portion includes an axially inwardly facing surface and an axially outwardly facing surface, the elastomeric member extending from the axially outwardly facing surface.

In addition to one or more of the features described above or below, or as an alternative, further embodiments could include wherein the intermediate portion includes one or more mounting members extending from the axially inwardly facing surface.

In addition to one or more of the features described above or below, or as an alternative, further embodiments could include wherein the support member includes at least one mounting member extending axially inwardly at the first end and at least one mounting member extending axially inwardly at the second end.

In addition to one or more of the features described above or below, or as an alternative, further embodiments could include wherein the elastomeric member includes a step region receptive of the one of the inlet and the swirl frame.

In addition to one or more of the features described above or below, or as an alternative, further embodiments could include wherein the inlet seal is mounted to the swirl frame.

In addition to one or more of the features described above or below, or as an alternative, further embodiments could include a torque tube extending through the inlet, the torque tube including a flange coupled to the swirl frame, the inlet seal being connected to the swirl frame through the flange.

In addition to one or more of the features described above or below, or as an alternative, further embodiments could include wherein the support member is formed from steel.

In addition to one or more of the features described above or below, or as an alternative, further embodiments could include wherein the elastomeric member is formed from neoprene.

In addition to one or more of the features described above or below, or as an alternative, further embodiments could include wherein the turboshaft engine is mounted in a rotary wing aircraft.

Also disclosed is a rotary wing aircraft including a fuselage, at least one rotor operatively connected to the fuselage, and a turboshaft engine supported by the fuselage and operatively connected to the at least one rotor. The turboshaft engine includes an inlet, a swirl frame mounted downstream of the inlet, and an inlet seal mounted to one of the inlet and the swirl frame extending toward the other of the inlet and the swirl frame. The inlet seal includes a support member and an elastomeric member having from a first end portion coupled to the support member and a second, cantilevered end portion.

In addition to one or more of the features described above or below, or as an alternative, further embodiments could include wherein the support member includes a discontinuous surface having a first end, a second end, and an intermediate portion extending therebetween.

In addition to one or more of the features described above or below, or as an alternative, further embodiments could include wherein the intermediate portion is curvilinear.

In addition to one or more of the features described above or below, or as an alternative, further embodiments could include wherein the intermediate portion includes an axially inwardly facing surface and an axially outwardly facing surface, the elastomeric member extending from the axially outwardly facing surface.

In addition to one or more of the features described above or below, or as an alternative, further embodiments could include wherein the intermediate portion includes one or more mounting members extending from the axially inwardly facing surface.

In addition to one or more of the features described above or below, or as an alternative, further embodiments could include wherein the support member includes at least one mounting member extending axially inwardly at the first end and at least one mounting member extending axially inwardly at the second end.

In addition to one or more of the features described above or below, or as an alternative, further embodiments could include wherein the elastomeric member includes a step region receptive of the one of the inlet and the swirl frame.

In addition to one or more of the features described above or below, or as an alternative, further embodiments could include wherein the inlet seal is mounted to the swirl frame.

In addition to one or more of the features described above or below, or as an alternative, further embodiments could include a torque tube extending through the inlet, the torque tube including a flange coupled to the swirl frame, the inlet seal being connected to the swirl frame through the flange.

BRIEF DESCRIPTION OF THE DRAWINGS

The following descriptions should not be considered limiting in any way. With reference to the accompanying drawings, like elements are numbered alike:

FIG. 5 depicts a plan view of the inlet seal of FIG. 4;

FIG. 6 depicts a partial cross-sectional view of the inlet seal mounted to the swirl frame; and FIG. 7 depicts a cross-sectional view of the inlet seal, in accordance with an aspect of an exemplary embodiment.

DETAILED DESCRIPTION

A detailed description of one or more embodiments of the disclosed apparatus and method are presented herein by way of exemplification and not limitation with reference to the Figures.

Figure 1:
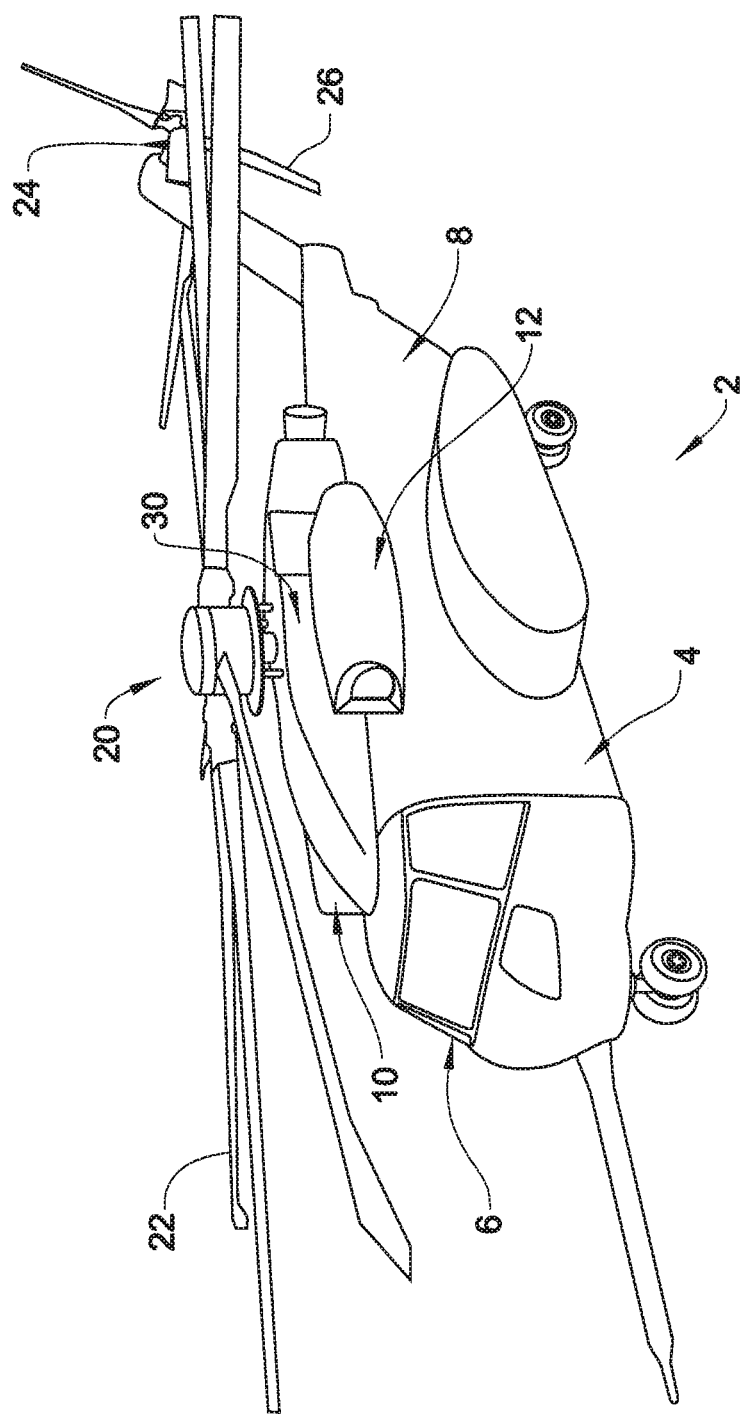
FIG. 1 depicts an aircraft, in the form of a rotary wing aircraft, including a turboshaft engine including an inlet seal, in accordance with an exemplary embodiment.

An aircraft, in accordance with an exemplary embodiment, is indicated generally at 2, in FIG. 1. Aircraft 2 is shown in the form of a single rotor rotary wing aircraft. However, it should be understood that aircraft 2 may take on a variety of forms and configurations, including coaxial rotary wing aircraft, a fixed wing aircraft, tilt rotor aircraft, or other aircraft types. Aircraft 2 includes an airframe or fuselage 4 having a cockpit 6 and a crew compartment 8. Fuselage 4 supports a first propulsion system or turboshaft engine 10 and a second propulsion system or turboshaft engine 12. First and second turboshaft engines 10 and 12 are operatively connected to a first rotor hub 20 having a first plurality of rotor blades 22 and a second rotor hub 24 having a second plurality of rotor blades 26. More specifically, a gearbox 30 operatively connects first and second turboshaft engines 10 and 12 with first and second rotor hubs 20 and 24.

Figure 2:
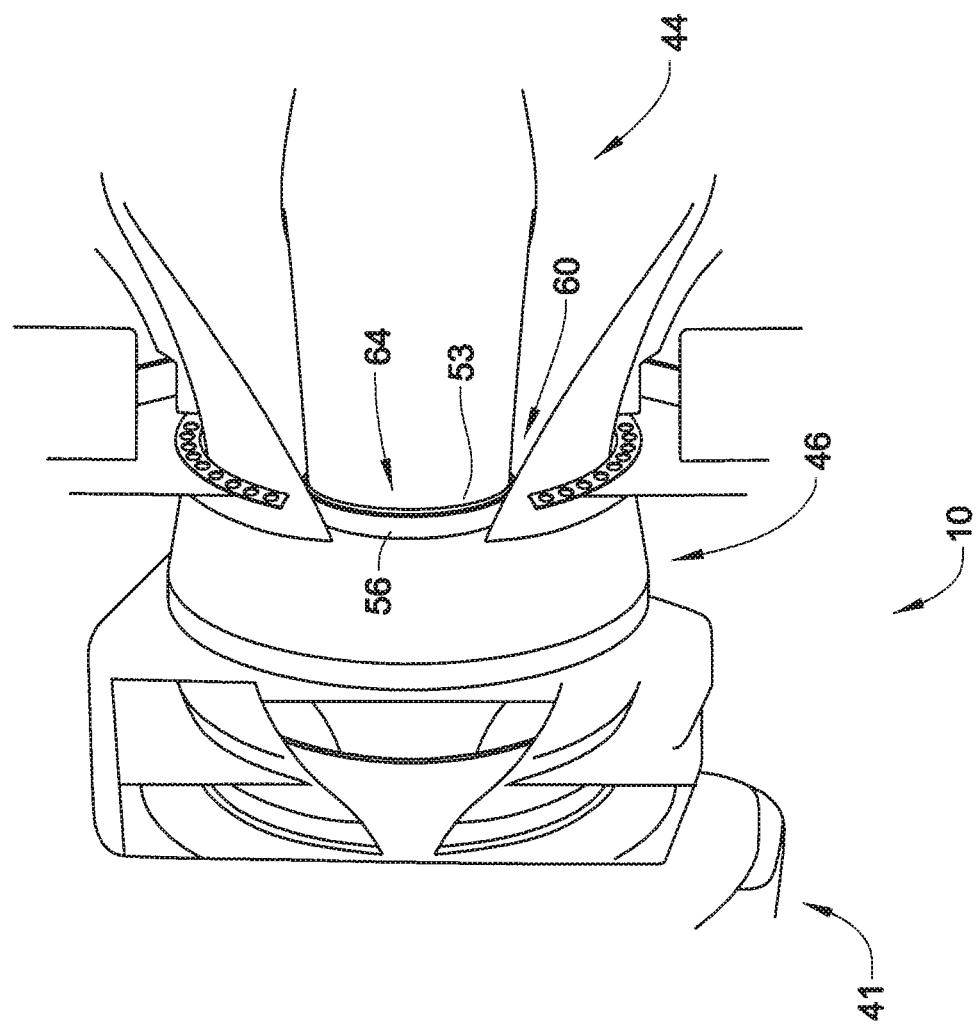
FIG. 2 is a partial view of the turboshaft engine of the rotary wing aircraft of FIG. 1.
Figure 3:
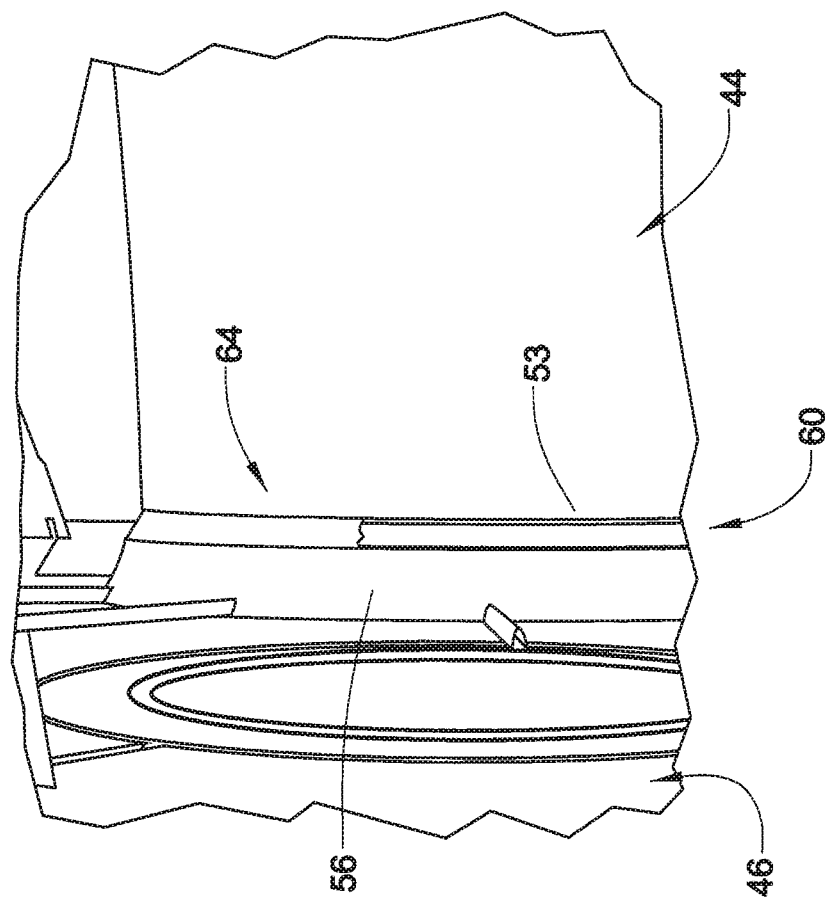
FIG. 3 illustrates a gap between an inlet and a swirl frame of the turboshaft engine of FIG. 2.
Figure 4:
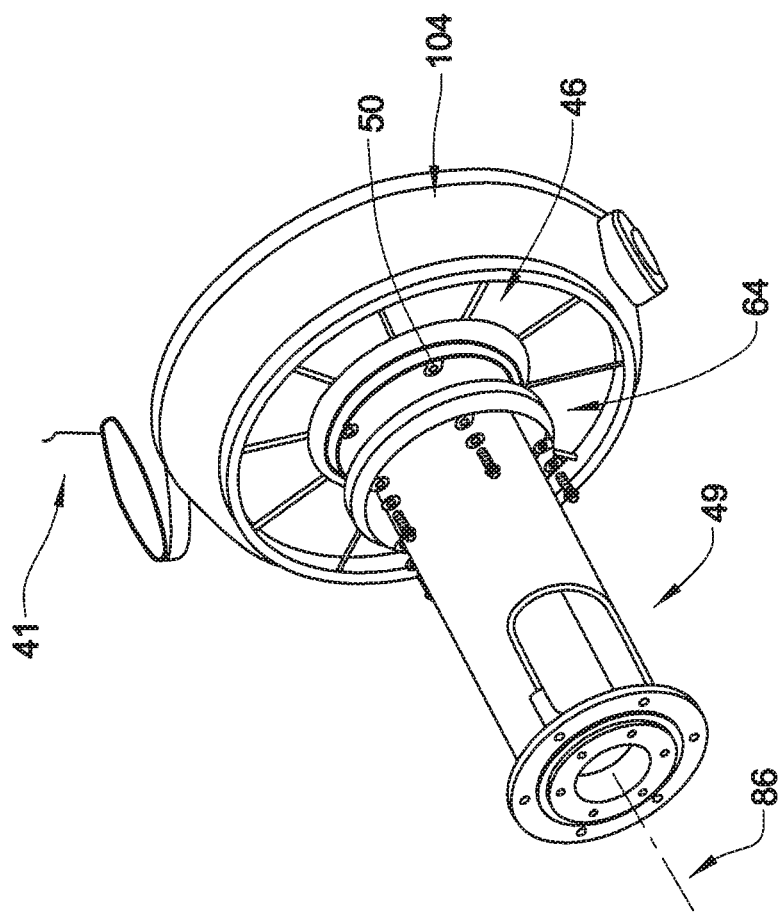
FIG. 4 depicts an inlet seal coupled to the swirl frame, in accordance with an exemplary embodiment.

Reference will now follow to FIGS. 2-4 in describing details of first turboshaft engine 10 with an understanding that second turboshaft engine 12 may include similar components. First turboshaft engine 10 includes a power plant 41 that converts thermal energy derived from fuel combustion into mechanical, rotational energy to drive first and second rotor hubs 20 and 24. Turboshaft engine 10 includes an inlet 44 that delivers intake air into a swirl frame 46 operatively connected to power plant 41. Swirl frame 46, in addition to conditioning the intake air prior to entry into power plant 41, supports a torque tube 49 that surrounds a drive shaft (not shown) operatively connecting engine 10 to first and second rotor hubs 20 and 24 through gearbox 30. Torque tube 49 includes a flange 50 having a predetermined bolt hole pattern (not separately labeled) that aligns with bolt holes (also not separately labeled) on swirl frame 46. Mechanical fasteners (also not separately labeled) pass through flange 50 to secure torque tube 49 to swirl frame 46.

In accordance with an aspect of an exemplary embodiment, inlet 44 includes a terminal end portion 53 that aligns with an airflow receiving portion 56 of swirl frame 46. Terminal end portion 53 delivers intake air into swirl frame 46. During assembly, a gap 60 may exist between terminal end portion 53 and airflow receiving portion 56 resulting from manufacturing tolerances, wear, and/or other factors. Gap 60 may provide a pathway for pressure to pass from inlet 44 and/or swirl frame 46 resulting in a potential loss of operating efficiency.

In accordance with an aspect of an exemplary embodiment, turboshaft engine 10 includes an inlet seal 64 that spans gap 60 to substantially eliminate leakage, improve flow transition from inlet 44 into power plant 41, and reduce flow disruptions. Inlet seal 64 includes a support member 70 and an elastomeric member 74. Elastomeric member 74 spans gap 60 to substantially reduce leakage. In accordance with an aspect of an exemplary embodiment, elastomeric member 74 may span a gap 60 that may be as large as about 0.6-inches (1.54-cm) or more. Support member 70 may be formed from a metal, such as 304 stainless steel, and includes a discontinuous surface 76 having a first end 78, a second end 79 and an intermediate portion 80 extending therebetween. Intermediate portion 80 includes an axially inwardly facing surface 82 and an axially outwardly facing surface 84. The term "axially" should be understood to refer to an axis 86 extending longitudinally through torque tube 49.

In further accordance with an aspect of an exemplary embodiment, support member 70 includes one or mounting members, one of which is indicated at 90, each having a corresponding opening 91. Mounting members 90 may extend from axially inwardly facing surface 82 at first end 78, second end 79 and at various points along intermediate portion 80. Mounting members 90 are arranged in a predetermined pattern so as to register with existing openings 91 on flange 50. In this manner, inlet seal 64 may be readily adaptable both as an initial installation component as well as a repair component to retrofit existing engines.

In still further accordance with an exemplary aspect, elastomeric member 74 may be formed from a heat resistant resilient material such as neoprene. Elastomeric member 74 includes a first end portion 94 coupled to axially outwardly facing surface 84, a second, cantilevered end portion 95, and an intermediate section 97. As such, elastomeric member 74 extends radially outwardly of support member 70. With this arrangement, inlet seal 64 may be operatively connected to swirl frame 46 through flange 50 of torque tube 49. Elastomeric member 74 extends towards, and abuts, terminal end portion 53 of inlet 44. In addition, elastomeric member 74 may include a step region 100 provided in intermediate section 97. Step region 100 may engage with engine cowling 104 to further reduce leakage.

At this point, it should be understood, that exemplary embodiments describe an inlet seal that can be mounted as a new part, or a retrofit part to rotary wing aircraft engines. The inlet seal bridges a gap between an inlet and a swirl frame of the engine. Further, the inlet seal includes a discontinuity that may accommodate a crotch assembly or inlet close-out mounted to turboshaft engine The inlet seal is designed to mate with existing fasteners on the engine to avoid the need for tooling changes or complicated retrofit processes. Finally, while the support member is described as being formed from 304 stainless steel, other materials both metal and otherwise may be utilized. Similarly, elastomeric member may be made from a variety of materials and therefore should not be considered to be limited to neoprene.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turboshaft engine comprising:
    an inlet;
    a swirl frame mounted downstream of the inlet; and
    an inlet seal mounted to one of the inlet and the swirl frame extending toward the other of the inlet and the swirl frame, the inlet seal including a support member having a first portion and a second portion that extends substantially radially outwardly of the first portion and an elastomeric member having a first end portion extending into the support member and a second, cantilevered end portion.

2. The turboshaft engine according to claim 1, wherein the support member includes a discontinuous surface having a first end, a second end, and an intermediate portion extending therebetween.

3. The turboshaft engine according to claim 2, wherein the intermediate portion is curvilinear.

4. The turboshaft engine according to claim 2, wherein the intermediate portion includes an axially inwardly facing surface and an axially outwardly facing surface, the elastomeric member extending from the axially outwardly facing surface.

5. The turboshaft engine according to claim 2, wherein the intermediate portion includes one or more mounting members extending from the axially inwardly facing surface.

6. The turboshaft engine according to claim 2, wherein the support member includes at least one mounting member extending axially inwardly at the first end and at least one mounting member extending axially inwardly at the second end.

7. The turboshaft engine according to claim 1, wherein the elastomeric member includes a step region receptive of the one of the inlet and the swirl frame.

8. The turboshaft engine according to claim 1, wherein the inlet seal is mounted to the swirl frame.

9. The turboshaft engine according to claim 1, further comprising: a torque tube extending through the inlet, the torque tube including a flange coupled to the swirl frame, the inlet seal being connected to the swirl frame through the flange.

10. The turboshaft engine according to claim 1, wherein the support member is formed from steel.

11. The turboshaft engine according to claim 1, wherein the elastomeric member is formed from neoprene.

12. The turboshaft engine according to claim 1, wherein the turboshaft engine is mounted in a rotary wing aircraft.

13. A rotary wing aircraft comprising:
    a fuselage;
    at least one rotor operatively connected to the fuselage; and
    a turboshaft engine supported by the fuselage and operatively connected to the at least one rotor, the turboshaft engine comprising:
        an inlet;
        a swirl frame mounted downstream of the inlet; and
        an inlet seal mounted to one of the inlet and the swirl frame extending toward the other of the inlet and the swirl frame, the inlet seal including a support member having a first portion and a second portion that extends substantially radially outwardly of the first portion and an elastomeric member having a first end portion extending into the support member and a second, cantilevered end portion.

14. The rotary wing aircraft according to claim 13, wherein the support member includes a discontinuous surface having a first end, a second end, and an intermediate portion extending therebetween.

15. The rotary wing aircraft according to claim 14, wherein the intermediate portion is curvilinear.

16. The rotary wing aircraft according to claim 14, wherein the intermediate portion includes an axially inwardly facing surface and an axially outwardly facing surface, the elastomeric member extending from the axially outwardly facing surface.

17. The rotary wing aircraft according to claim 14, wherein the intermediate portion includes one or more mounting members extending from the axially inwardly facing surface.

18. The rotary wing aircraft according to claim 14, wherein the support member includes at least one mounting member extending axially inwardly at the first end and at least one mounting member extending axially inwardly at the second end.

19. The rotary wing aircraft according to claim 13, wherein the elastomeric member includes a step region receptive of the one of the inlet and the swirl frame.

20. The rotary wing aircraft according to claim 13, wherein the inlet seal is mounted to the swirl frame.

21. The rotary wing aircraft according to claim 13, further comprising: a torque tube extending through the inlet, the torque tube including a flange coupled to the swirl frame, the inlet seal being connected to the swirl frame through the flange.

* * * * *